United States Patent
Michot

(10) Patent No.: US 10,218,956 B2
(45) Date of Patent: Feb. 26, 2019

(54) METHOD AND APPARATUS FOR GENERATING A DEPTH CUE

(71) Applicant: TELEFONAKTIEBOLAGET L M ERICSSON (PUBL), Stockholm (SE)

(72) Inventor: Julien Michot, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 383 days.

(21) Appl. No.: 14/431,699

(22) PCT Filed: Oct. 1, 2012

(86) PCT No.: PCT/EP2012/069385
§ 371 (c)(1),
(2) Date: Mar. 26, 2015

(87) PCT Pub. No.: WO2014/053165
PCT Pub. Date: Apr. 10, 2014

(65) Prior Publication Data
US 2015/0208054 A1    Jul. 23, 2015

(51) Int. Cl.
*H04N 13/122* (2018.01)
*H04N 13/128* (2018.01)
(Continued)

(52) U.S. Cl.
CPC ......... *H04N 13/122* (2018.05); *H04N 13/128* (2018.05); *H04N 13/366* (2018.05); *H04N 2013/0081* (2013.01)

(58) Field of Classification Search
CPC ................................................. H04N 13/0018
(Continued)

(56) References Cited

U.S. PATENT DOCUMENTS 6,157,733 A * 12/2000 Swain .................... G06T 15/02
                                                    382/154
2004/0135739 A1* 7/2004 Fukushima ............ G09G 3/003
                                                    345/6
(Continued)

FOREIGN PATENT DOCUMENTS

WO        98/48381 A1    10/1998
WO     2012063911 A1     5/2012

OTHER PUBLICATIONS

Hubona et al. "The Relative Contributions of Stereo, Lighting, and Background Scenes in Promoting 3D Depth Visualization", ACM, vol. 6, No. 3,Sep. 1999, XP040110398, pp. 214-242.
(Continued)

*Primary Examiner* — Jeremiah C Hallenbeck-Huber
*Assistant Examiner* — Amir Shahnami
(74) *Attorney, Agent, or Firm* — Rothwell, Figg, Ernst & Manbeck, P.C.

(57) ABSTRACT

A method of generating a depth cue for three dimensional video content is disclosed. The method comprises the steps of (a) detecting three dimensional video content that will appear in observer space when displayed (110) (b) identifying a reference projection parameter (120) (c) estimating a location of a shadow that would be generated by the detected content as a consequence of a light source emitting light according to the reference projection parameter (130) and (d) projecting light content imitating a shadow to the estimated location to coincide with display of the three dimensional video content (140). Also disclosed are a computer program product for carrying out a method of generating a depth cue for three dimensional video content and an apparatus (800) for generating a depth cue for three dimensional video content.

19 Claims, 6 Drawing Sheets

(51) Int. Cl.
*H04N 13/366* (2018.01)
*H04N 13/00* (2018.01)

(58) Field of Classification Search
USPC .......................................... 348/46
See application file for complete search history.

(56) References Cited

U.S. PATENT DOCUMENTS

2010/0315488 A1* 12/2010 Kim .................. H04N 13/0018
348/46
2012/0176473 A1* 7/2012 Genova .............. H04N 13/0011
348/46

OTHER PUBLICATIONS

"Cartoon Dioramas in Motion", ACM, 2002, XP040133822, 7 pages.
European Communication dated Dec. 15, 2017, issued in European Patent Application No. 12770107.6, 4 pages.

* cited by examiner

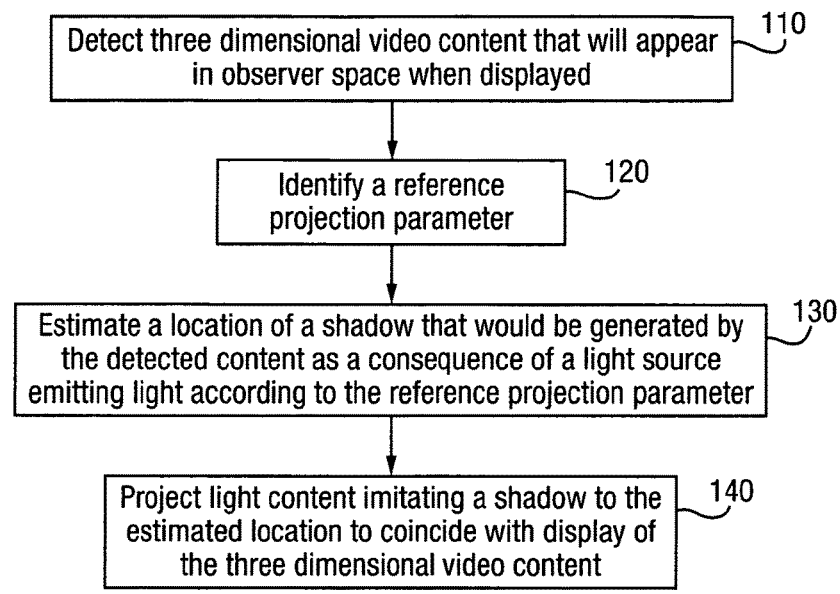
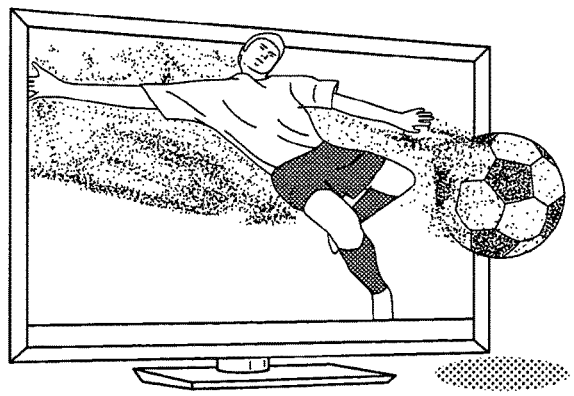

Fig. 3
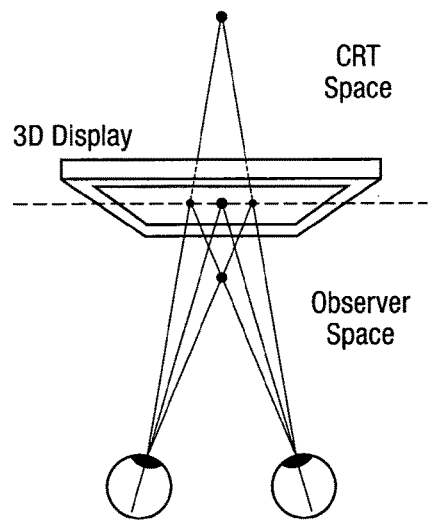
Fig. 4(a)  Fig. 4(b)  Fig. 4(c)
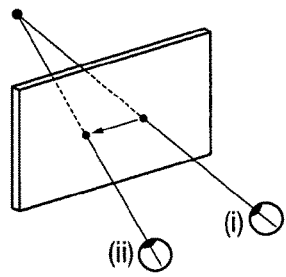 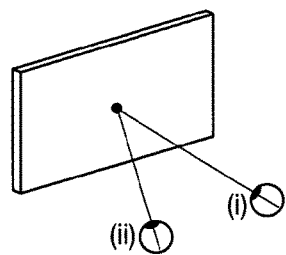 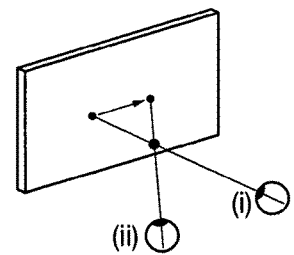

METHOD AND APPARATUS FOR GENERATING A DEPTH CUE

CROSS REFERENCE TO RELATED APPLICATION(S)

This application is a 35 U.S.C. § 371 National Phase Entry Application from PCT/EP2012/069385, filed Oct. 1, 2012, designating the United States, the disclosure of which is incorporated herein in its entirety by reference.

TECHNICAL FIELD

The present invention relates to a method and an apparatus for generating a depth cue for three dimensional video content. The invention also relates to a computer program product configured to implement a method for generating a depth cue for three dimensional video content.

BACKGROUND

Three dimensional video technology continues to grow in popularity and 3D technology capabilities in the entertainment and communications industries in particular have evolved rapidly in recent years. Production studios are now developing a number of titles for 3D cinema release each year, and 3D enabled home cinema systems are widely available. Research in this sector continues to gain momentum, fuelled by the success of current 3D product offerings and supported by interest from industry, academia and consumers.

3D technology provides an observer with an impression of depth in a compound image, causing parts of the image to appear to project out in front of a display screen, into what is known as observer space, while other parts of the image appear to project backwards into the space behind the screen, into what is known as CRT space.

The term 3D is usually used to refer to a stereoscopic experience, in which an observer's eyes are provided with two slightly different images of a scene, which images are fused in the observer's brain to create the impression of depth. This effect is known as binocular parallax and is typically used in 3D films for cinema release. The technology provides an excellent 3D experience to a stationary observer. However, stereoscopic technology is merely one particular technique for producing 3D video images. Free viewpoint television (FTV) is a new audiovisual system that allows observers to view 3D video content while freely changing position in front of a 3D video display. In contrast to stereoscopic technology, which requires the observer to remain stationary to experience the 3D content, FTV allows an observer to view a scene from many different angles, greatly enhancing the impression of being actually present within the scene.

The FTV functionality is enabled by capturing a scene using many different cameras which observe the scene from different angles or viewpoints. These cameras generate what is known as multiview video. Multiview video can be relatively efficiently encoded by exploiting both temporal and spatial similarities that exist in different views. However, even with multiview coding (MVC), the transmission cost for multiview video remains prohibitively high. To address this, current versions of FTV only actually transmit a subset of captured multiple views, typically between 2 and 3 of the available views. To compensate for the missing information, depth or disparity maps are used to recreate the missing data. From the multiview video and depth/disparity information, virtual views can be generated at any arbitrary viewing position. Many techniques exist in the literature to achieve this, depth image-based rendering (DIBR) being one of the most prominent.

A depth map, as used in FTV, is simply a greyscale image of a scene in which each pixel indicates the distance between the corresponding pixel in a video object and the capturing camera optical centre. A disparity map is an intensity image conveying the apparent shift of a pixel which results from moving from one viewpoint to another. The link between depth and disparity can be appreciated by considering that the closer an object is to a capturing camera, the greater will be the apparent positional shift resulting from a change in viewpoint. A key advantage of depth and disparity maps is that they contain large smooth surfaces of constant grey levels, making them comparatively easy to compress for transmission using current video coding technology.

Volumetric display or light field display is another visual system providing three dimensional viewing based on a three dimensional model of an object.

Regardless of the particular technology used to create a 3D video image, rendering the image believable in order to provide a good 3D experience to an observer remains a challenging task. Most 3D technologies aim to provide as many depth cues as possible in order to assist an observer in tolerating, understanding and enjoying the 3D content. The key depth cue in stereoscopic technologies is the binocular parallax discussed above. However, this is merely one of many depth cues used in ordinary life to give rise to depth perception. The absence of additional depth cues which would normally be available to an observer's brain to process depth perception can hinder the development of a fully immersive 3D video experience.

SUMMARY

It is an aim of the present invention to provide a method, apparatus and computer program product which obviate or reduce at least one or more of the disadvantages mentioned above.

According to a first aspect of the present invention, there is provided a method of generating a depth cue for three dimensional video content, comprising the steps of (a) detecting three dimensional video content that will appear in observer space when displayed; (b) identifying a reference projection parameter; (c) estimating a location of a shadow that would be generated by the detected content as a consequence of a light source emitting light according to the reference projection parameter; and (d) projecting light content imitating a shadow to the estimated location to coincide with display of the three dimensional video content.

The present invention facilitates an improved 3D experience by incorporating an additional depth cue into the provision of 3D video content. The additional depth cue takes the form of an imitation shadow or shadows generated to appear in a position coherent with the 3D video content that appears in observer space, that is in front of the screen displaying the video content. The generated imitation shadow may assist in reinforcing the impression of reality provided by the video content, improving the immersive experience for the observer.

Steps (a) to (d) of the method may be conducted for each frame of the three dimensional video content. In this manner, each frame may be associated with a corresponding assembly of imitation shadow or shadows, which are projected to coincide with display of the associated frame. Thus as each frame is displayed in sequence, giving the impression of moving objects, the imitation shadows appear to move in a coherent manner with the objects, reinforcing the credibility of the depth cue.

According to an embodiment, step (a) of the method may comprise identifying three dimensional video content according to a sign of its associated disparity value. Step (a) may comprise identifying three dimensional video content having negative disparity, in cases where disparity is measured from right to left. In cases where disparity is measured form left to right, step (a) may comprise identifying three dimensional video content having positive disparity. Disparity information may be transmitted as part of the 3D video content and may therefore be readily available, affording a convenient way of identifying that content which will appear outside of the screen in observer space, and thus may be appropriate for shadow generation. In some embodiments, a display apparatus for the three dimensional video content may be configured to dictate a plane of zero disparity, thus differentiating between content having disparity of different signs and so bounding the content to be displayed in observer space.

Identifying video content according to a sign of its disparity value may comprise identifying the content directly from a disparity map associated with the three dimensional video content. Alternatively, identifying video content according to a sign of its disparity value may comprise identifying content having a depth less than a distance Zc between a camera and a convergence plane located at the position of a display screen. In some embodiments, the distance Zc may be determined or dictated by a display apparatus for the three dimensional video content.

Identifying video content according to a sign of its disparity value may further comprise generating a disparity map. A disparity map may not be already associated with the three dimensional video content, for example in the case of stereoscopic three dimensional technology. In such cases the method may further comprise generating a disparity map for the three dimensional video content, employing for example feature matching or optical flow. Suitable techniques for feature matching may include scale invariant feature transform (SIFT), or speeded up robust features (SURF).

According to another embodiment, step (a) of the method may further comprise identifying from the detected content objects having a width greater than a threshold value. Step (c) of the method may comprise estimating a location of a shadow that would be generated by the identified objects. In this manner, the method of the present invention may generate imitation shadows only for objects having a size judged to be significant. By placing a lower threshold on a size of objects for which shadows are to be generated, the benefit afforded by the imitation shadows is maximised, and complications which may arise from generating an excessive number of very small shadows are avoided. The threshold size may be selected according to the video content and the capabilities of an apparatus for light projection. In one embodiment, the threshold size may be between 5 and 50 pixels, and may be for example 10 pixels.

According to an embodiment, the reference projection parameter may comprise at least one of a position or a direction. The reference projection parameter may for example comprise a position or location identified in 3D space, or may comprise a direction vector. In another example, the reference projection parameter may comprise a position orientation matrix. Other reference projection parameters may be envisaged.

According to an embodiment, step (b) of the method may comprise obtaining a stored projection parameter from a memory. The projection parameter may be determined in advance for example by a manufacturer and stored in a memory of a 3D display apparatus on which the method may run. The projection parameter may thus be quickly retrieved and used for the estimation of a shadow location. Alternatively, a producer of 3D video content may set a projection parameter, which parameter may be retrieved from encoded three dimensional video content.

The projection parameter may be arbitrary or may be selected according to certain design parameters. The parameter may be static or may be changing or changeable. For example, the parameter may be a position which may change over time, or a direction vector which may change over time.

According to another embodiment, step (b) may comprise detecting a virtual light source within the three dimensional video content, and obtaining a projection parameter of the virtual light source from the three dimensional video content. In this manner, coherence with the three dimensional video content may be maximised.

According to another embodiment, step (b) may comprise detecting a real light source and a projection parameter of the real light source from a surrounding environment. The light source may for example be a lamp or other electric light, or may be the sun appearing for example through a window or a door of a room. In this manner, imitation shadows may be generated which are coherent with the environment in which an observer is watching the video content.

According to another embodiment, step (b) may comprise detecting a viewer and a projection parameter of the viewer from a surrounding environment.

According to further embodiments, any or all of the identifying steps discussed above may be combined, for example as alternatives, to incorporate the advantages of coherence with displayed video content and/or an observer environment.

According to an embodiment, step (c) of the method may comprise projecting the detected content onto a modelled shadow receiving surface according to the reference projection parameter. This may enable accurate estimation of location and boundaries of a shadow to be generated.

In some embodiments, the projection may be an orthogonal projection, for example representing light being emitted from a distant light source such as the sun. In this case, the identified reference parameter according to which the content is projected may be a direction vector, and the estimated location may be consistent with a shadow generated as a consequence of a light source emitting light along the direction vector. The direction vector may thus represent a direction vector from the light source to the content. In other embodiments, the projection may be a perspective projection, for example representing light being emitted from a light source relatively close to the displayed video content. In this case the identified reference parameter according to which the content is projected may be a position orientation matrix, and the estimated location may be consistent with a shadow generated as a consequence of a light source positioned according to the position orientation matrix.

The modelled shadow receiving surface may be a planar surface, for example corresponding to a surface on which a display apparatus for the three dimensional video content is mounted. Alternatively, the modelled shadow receiving surface may be a three dimensional model of a room in which a display apparatus for the three dimensional video content is situated.

According to an embodiment, step (d) of the method may comprise projecting light content using one of a lighting system or a projector.

The lighting system may for example be a display mounted lighting system. The lighting system may be situated on all sides of the display.

According to another aspect of the present invention, there is provided a computer program product configured, when run on a computer, to implement a method according to the first aspect of the present invention.

According to another aspect of the present invention, there is provided apparatus for generating a depth cue for three dimensional video content, the apparatus comprising an estimator configured to estimate a location for a depth cue and a generator configured to generate the depth cue. According to embodiments of the invention, the estimator may comprise a detector configured to detect three dimensional video content that will appear in observer space when displayed, an identifier configured to identify a reference projection parameter, and an estimating unit configured to estimate a location of a shadow that would be generated by the detected content as a consequence of a light source emitting light according to the reference projection parameter. The generator may be configured to project light content imitating a shadow to the estimated location to coincide with display of the three dimensional video content.

According to an embodiment, the apparatus may comprise a display screen for displaying the 3D video content. The apparatus may for example comprise a television.

According to another embodiment, the identifier may comprise at least one sensor operable to sense at least one of a light source or a viewer. The sensor may be operable to sense a projection parameter of the light source and/or the viewer.

According to a further embodiment, the generator may comprise at least one of a lighting system or a projector system.

BRIEF DESCRIPTION OF THE DRAWINGS

For a better understanding of the present invention, and to show more clearly how it may be carried into effect, reference will now be made, by way of example, to the following drawings in which:

FIG. 1 is a flow chart illustrating steps in a method of generating a depth cue for three dimensional video content;

FIG. 2 shows a depth cue generated for a frame of three dimensional video content;

FIG. 3 illustrates observer space in a three dimensional video display;

FIGS. 4a to 4c illustrate positive, negative and zero disparity;

FIGS. 7a to 7c 7 are partial flow charts illustrating alternative steps in the flow chart of FIG. 6;

DETAILED DESCRIPTION

Figure 5:
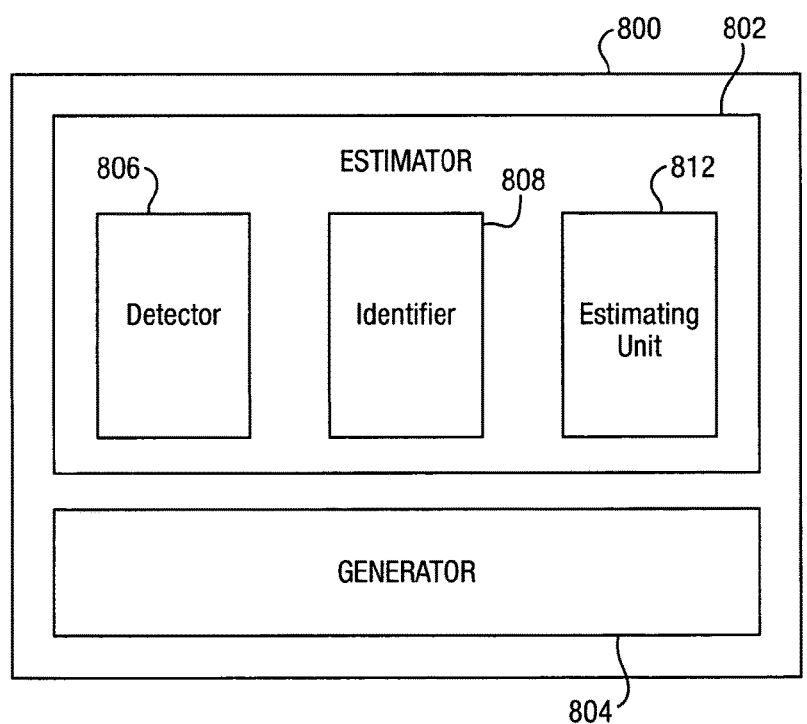
FIG. 5 shows an apparatus for generating a depth cue for three dimensional video content.

FIG. 1 illustrates steps in a method 100 of generating a depth cue for three dimensional video content in accordance with an embodiment of the present invention. The 3D video content may for example be generated using stereoscopic technology, FTV technology or any other appropriate technology. The video content may comprise a series of frames and may for example be recorded at 24 frames per second, 30 frames per second, 48 frames per second or any other suitable frame rate.

The method 100 generates a depth cue in the form of an imitation shadow, which is generated in a coherent position with respect to 3D video content which appears in observer space when displayed.

With reference to FIG. 1, a first step 110 of the method 100 comprises detecting 3D video content that will appear in observer space when displayed. Having detected appropriate video content, the method then proceeds, at step 120, to identify a reference projection parameter. In a next step 130, the method proceeds to estimate a location of a shadow that would be generated by the detected content as a consequence of a light source emitting light according to the reference projection parameter. Finally, at step 140, the method proceeds to project light content imitating a shadow to the estimated location, to coincide with display of the 3D content.

As noted above, the human brain uses a wide range of depth cues to assess a surrounding environment and perceive depth of an object within the environment. 3D video content typically uses far fewer depth cues than are available in real life, relying principally on binocular parallax to create the impression of depth. In generating an additional depth cue for 3D video content, the method of the present invention renders the content more acceptable and believable to an observer. The depth cue assists the brain of an observer in processing and understanding the video content, improving the immersive experience.

Lighting and shading can provide an effective cue for the brain in determining both the shape of an object and its position in space. The human brain is accustomed to using lighting and shading cues in ordinary life. While conscious focus may be directed towards an object rather than the shadow it generates, the shape and position of the shadow are registered by the brain and processed to assist with deciphering the scene being observed. The depth cue provided by the present invention serves a similar purpose. While a viewer may not directly observe the generated imitation shadow, the presence of the shadow will be registered in the observer's brain and will help to reinforce the credibility of the 3D content being displayed.

FIG. 2 illustrates an example view of a single image taken from 3D video content with an imitation shadow generated according to the present invention. Content appearing in observer space has been detected in the form of the football which appears to be travelling towards the observer. A reference projection parameter has been identified corresponding to a light source emitting light from a location above the ball, and a location of a shadow that would be generated by the ball as a consequence of a light source emitting light from this location has been estimated. Finally, light content imitating a shadow has been projected to that location to coincide with display of the image. Generation of an actual shadow would require introducing a solid object in front of an appropriate light source. However, through projection of appropriate light content, a visual effect imitating the appearance of a shadow can be generated. This imitation is sufficient to act as a depth cue to the brain, appearing as it does in a position where a shadow would appear were the 3D video object to be solid.

Referring again to FIG. 1, and in accordance with an embodiment of the invention, the method step 110 of identifying 3D video content that will appear in observer space when displayed may be accomplished by considering the disparity of the objects appearing in the 3D video content. As discussed above, disparity indicates the apparent shift of a pixel as a consequence of a change in viewpoint. The size and direction of this shift are directly related to the position of the object with respect to an observer and a display screen, as discussed below.

As illustrated in FIG. 3, observer space is the region of space between a display screen and an observer. CRT (or display) space is the region of space appearing behind the display screen with respect to an observer. The apparent shift of objects appearing in CRT space and observer space as a consequence of a change in viewpoint is illustrated in FIG. 4. FIG. 4(*a*) shows an object appearing in CRT space. The effect of moving from a first viewpoint (i) to a second viewpoint (ii) is to cause an apparent shift of the object to the left, as indicated by the arrow. FIG. 4(*c*) shows an object in observer space. The effect of moving from viewpoint (i) to viewpoint (ii) for the object in observer space is to cause an apparent shift of the object to the right, as indicated by the arrow. FIG. 4(*b*) shows an object appearing on the display screen, and demonstrates that there is no apparent shift of the object on the screen as a result of a change in viewpoint. The apparent shift, or disparity, of objects in observer space can thus be seen from FIG. 4 to be opposite to the disparity of objects in CRT space. With disparity calculated according to a viewpoint shift from right to left as shown in FIG. 4, objects in observer space are considered to have negative disparity, while objects appearing in CRT space are considered to have positive disparity. The sign of the disparity is reversed if it is calculated according to a viewpoint shift from left to right. Disparity is zero for objects appearing at the display screen. It can therefore be appreciated that identifying objects appearing in observer space may be accomplished by identifying those objects displaying negative disparity (calculated right to left) or positive disparity (calculated left to right). Disparity information may be obtained from a disparity map, which may be associated with 3D video content.

In accordance with another embodiment of the invention, the step 110 of the method may be accomplished by considering the depth of objects appearing in the video content. As discussed above, and demonstrated in FIG. 4, depth and disparity are closely related. Objects appearing in observer space, and hence having negative disparity (right to left), are also those objects having a depth with respect to a capturing camera optical centre of less than the distance between the camera and a convergence plane of the camera. Objects having a depth less than a distance Zc to the convergence plane, will therefore appear in observer space.

Having identified objects that will appear in observer space when displayed, the method then proceeds at step 120 to identify a reference projection parameter. A conventional shadow is generated as a consequence of an interaction between an object and light emitted from a light source. The object blocks the path of light emitted form the source and hence causes a shadow. Identification of a reference projection parameter enables representation of light emitted by a light source, and hence estimation of where a shadow caused by an object as a consequence of the light source would appear. The reference projection parameter may be a position, and may therefore enable representation of light emitted by a light source located at that position. Alternatively, the reference projection parameter may be a direction, and may enable representation of light emitted by a light source along that direction. In other examples, the reference projection parameter may be a position orientation matrix, and may enable representation of a light source emitting light and positioned according to the position orientation matrix. The reference projection parameter may be associated with a virtual light source or with a real light source. The light source may be real in the sense that it may be a physical light source the presence and a projection parameter (for example position or position orientation matrix) of which may be detected as part of the process of identifying a reference projection parameter.

Embodiments of the invention are described herein as identifying a reference projection parameter after detecting 3D video content that will appear in observer space when displayed. However according to other embodiments of the present invention, the method may comprise detecting 3D video content that will appear in observer space when displayed after identifying a reference projection parameter.

Once a reference projection parameter has been identified and content that will appear in observer space has been detected, the method proceeds at step 130 to estimate the location of a shadow that would be generated by the detected content object appearing in observer space as a consequence of a light source emitting light according to the reference projection parameter. According to embodiments of the invention, and depending upon the nature of the reference projection parameter, this may comprise estimating a location of a shadow that would be generated as a consequence of a light source located at an identified reference position, or emitting light along an identified reference direction, or positioned according to an identified reference position orientation matrix. According to embodiments of the invention, estimating a location may be accomplished by projecting the three dimensional identified object onto a two dimensional shadow receiving surface. This projection may be made according to the reference projection parameter, which may for example be a direction vector from a nominal, virtual or real light source to the object, or a position orientation matrix of a nominal, virtual or real light source. The projection of the object onto the shadow receiving surface generates positional information for the shadow that would be generated by the object as a consequence of a light source emitting light according to the reference projection parameter.

Finally, at step 140, the method proceeds to project light content imitating a shadow to the location estimated in the previous step 130. This projection is timed to coincide with display of the 3D video content such that the imitation shadow is projected concurrently with the object "causing" the shadow.

FIG. 5 illustrates functional units of an apparatus 800 in accordance with an embodiment of the invention. The apparatus 800 may execute the steps of the method 100, for example according to computer readable instructions received from a computer program.

With reference to FIG. 5, the apparatus 800 comprises an estimator 802 and a generator 804. The estimator 802 comprises a detector 806, an identifier 808 and an estimating unit 812. It will be understood that the units of the apparatus are functional units, and may be realised in any appropriate combination of hardware and/or software. In one embodiment the apparatus 800 may further comprise a display screen configured for display of 3D video content. The apparatus 800 may for example comprise a television.

The detector 806 of the apparatus 800 is configured to detect 3D video content that will appear in observer space when displayed. The identifier 808 is configured to identify a reference projection parameter and the estimating unit 812 is configured to estimate a location of shadow that would be generated by the content detected by the detector 806 as a consequence of a light source emitting light according to the reference projection parameter identified by the identifier 808. The generator 804 is configured to project light content imitating a shadow to the location estimated by the estimator 802. The generator is further configured to project the light content at a time to coincide with display of the 3D video content.

Figure 6:
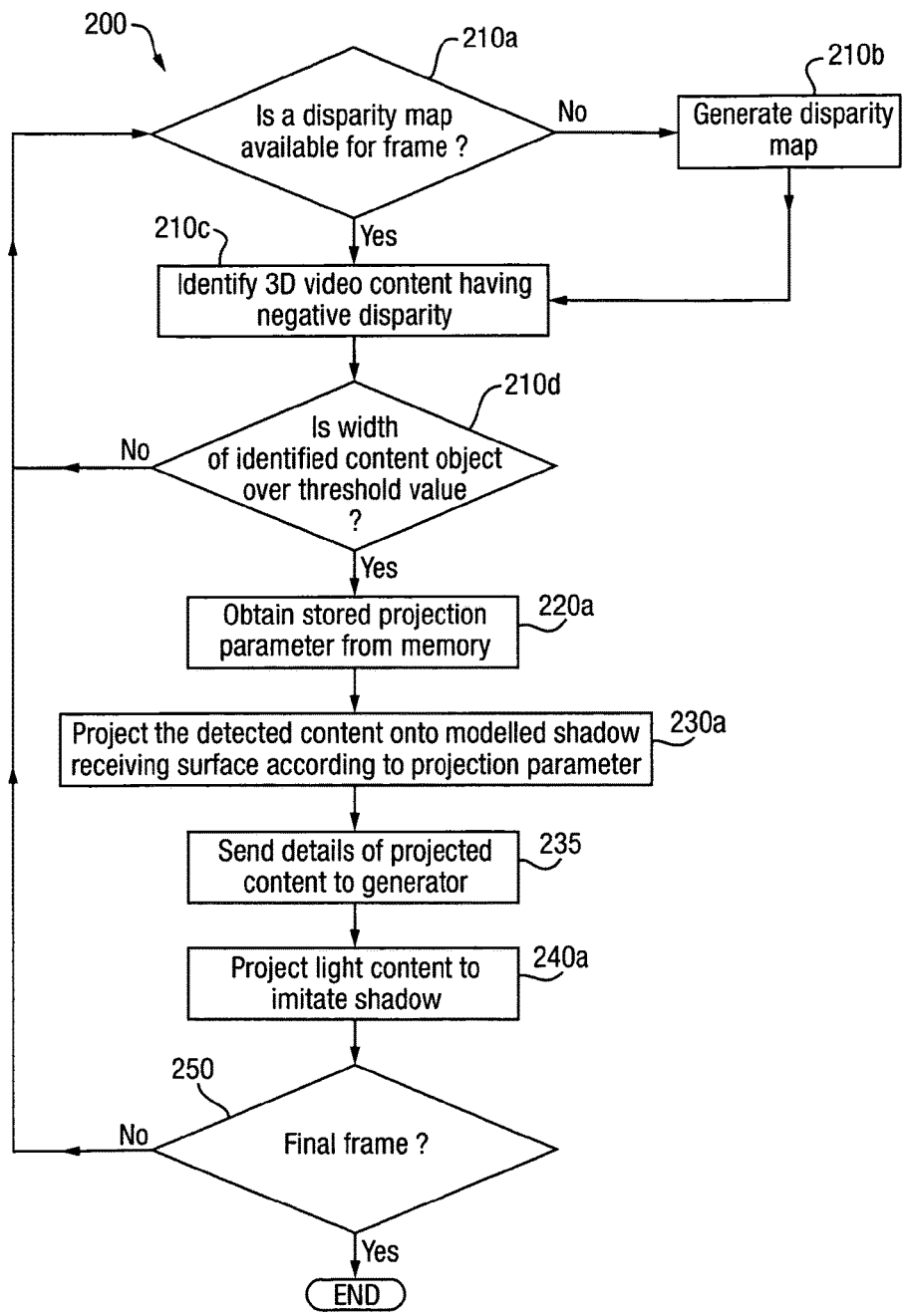
FIG. 6 is a flow chart illustrating steps in another embodiment of a method of generating a depth cue for three dimensional video content.

FIG. 6 illustrates steps in a method 200 for generating a depth cue for 3D video content in accordance with another embodiment of the present invention. The method 200 illustrates one example of how the steps of the method 100 may be further subdivided in order to realise the functionality discussed above. The method 200 also comprises additional steps which may be conducted in accordance with embodiments of the present invention.

The method 200 may also be executed by the apparatus 800 and the following disclosure discusses how the method 200 may be executed by the apparatus 800. However, it will be appreciated that the method 200 is not limited to being executed in this manner.

With reference to FIGS. 5 and 6, in a first step 210*a* of the method 200, the detector 806 makes an assessment as to whether or not a disparity map is available for a frame of the 3D video content under consideration. For FTV video content, reference to either a disparity map or a depth map is an integral part of displaying the video content, and thus either a depth map or a disparity map will be available for each frame of the video content. For stereoscopic video content, a depth or disparity map is not required for the transmission of images, and neither map is therefore likely to be immediately available. In the case of volumetric display, display is based on a three dimensional model, form which a depth map may be easily extracted.

It the detector 806 determines at step 210*a* that a disparity map is available for the frame in question, then the detector 806 proceeds directly to step 210*c*. If however the detector 806 determines that a disparity map is not available, the detector proceeds to generate a suitable disparity map for the frame at step 210*b*. If a depth map is available for the frame, a disparity map may be generated directly from the depth map. As discussed above, the concepts of depth and disparity are mathematically linked, and according to one embodiment of the invention, the following formula may be used to generate a disparity map form a depth map:

$$D = h - (b*f)/d = b*f(1/Zc - 1/d)$$

Where:
D=disparity
d=depth
h=sensor shift
f=focal length
b=baseline
Zc=the distance to the convergence plane.

The parameters h, b, f and Zc are all dependent upon the particular screen on which the 3D video content will be displayed. This information may be stored in a memory accessible to the detector 806 or may be determined by the detector 806 during the process of calculating disparity.

In the case of stereoscopic video content, there may not be a depth map available for the frame, from which a disparity map may be generated. In this case other processes may be employed by the detector 806 to generate the disparity map. According to embodiment of the invention, these processes may include feature matching, for example employing scale invariant feature transform (SIFT), or speeded up robust features (SURF), or optical flow. As discussed above, in the case of volumetric display, a depth map may easily be extracted from the accompanying 3D model, and subsequently converted into a disparity map. Embodiments of the present invention may also be employed in connection with two dimensional video content that is converted to three dimensional video content by generating an approximate depth map. Techniques such as depth form motion may be employed to approximate a depth map for two dimensional video content. The approximate depth map may be used to display the content in three dimensions, and according to the present invention, may be converted to a disparity map at step 210*b* to allow generation of a depth cue. After determining at step 210*a* that a disparity map is available for the frame, or generating a suitable disparity map at step 210*b*, the detector 806 proceeds to identify video content having negative disparity at step 210*c*. For the purposes of the present embodiment, it is assumed that disparity is calculated according to a viewpoint shift from right to left. However, other embodiments may comprise identifying video content having positive disparity, if disparity is calculated according to a viewpoint shift from left to right. As discussed in detail above, video content having negative disparity (calculated right to left) will appear in observer space when displayed, and thus may be suitable for imitation shadow generation.

In an alternative embodiment (not shown), step 210*c* may comprise identifying video content having a depth of less than Zc. Assessing depth in this manner has the same effect of identifying video content that will appear in observer space when displayed, as discussed in further detail above.

Having identified video content having negative disparity (or depth <Zc), the detector 806 proceeds at step 210*d* to consider whether or not a width of objects within the content is greater than a threshold value. The threshold value may be set according to manufacturer requirements or other design parameters and may be expressed in pixels. In other embodiments, the threshold value may be set by a producer of the video content and encoded with the content. An example threshold may be set at between 5 and 50 pixels and may for example be 10 pixels. This step has the effect of filtering out very tiny objects for which a shadow may be too small to represent a worth while depth cue.

If no object within the identified content is determined at step 210*d* to have a width greater than the threshold value, the detector 806 may return to step 210*a* to consider the next frame. Alternatively, if several objects are determined to have a width greater than the threshold value, the apparatus 800 may proceed to perform the subsequent steps for each of the identified objects. In another embodiment (not shown) the detector 806 may further filter identified objects of sufficient width by their location within observer space, only selecting for further processing those objects appearing in a particular part of observer space. In another embodiment, the detector 806 may select only one object for subsequent processing. This may for example be the widest object, the largest object, an object appearing within a particular section of observer space, etc.

In another embodiment (not shown) step 210*d* may be replaced with a referral to a list of objects for shadow generation provided by the producer of the video content and encoded with the video content. In this manner, a producer of video content may control the objects for which shadows are generated and so maintain control over the final appearance of the content when displayed.

Referring again to FIG. 6, and once a detected object has been identified by the detector 806 as having a width greater than the threshold value, the identifier 808 of the apparatus 800 proceeds to identify a reference projection parameter by obtaining, at step 220a, a stored reference projection parameter from a memory. In accordance with an embodiment, the reference projection parameter may comprise a position orientation matrix of a virtual light source. The position orientation matrix may be set by a manufacturer of the apparatus 800 and stored in a memory accessible to the identifier 808. In other embodiments, the reference projection parameter may comprise a position, or a direction vector, for example representing a position of a virtual light source, or a direction along which a virtual light source emits light. The virtual light source may be a very distant light source, such as a virtual position of the sun, which may be represented by a reference direction vector. Alternatively, the light source may be positioned closer to the objects displayed in the video content, and represented by a position orientation matrix. The nature and value of the reference projection parameter may be determined by a manufacturer of the apparatus and stored in a memory accessible to the identifier. According to another embodiment, a reference projection parameter may be set by a producer of the three dimensional video content, and may be encoded within the three dimensional video content. According to this embodiment, the identifier 808 may obtain, at an alternative step 220b, a reference projection parameter by retrieving the parameter from encoded three dimensional video content.

According to further embodiments, the reference projection parameter may be stored or encoded together with features of a light source with which it is associated. For example, the reference projection parameter may comprise a position orientation matrix and may be stored together with information concerning the intensity and colour of a light source the position and orientation of which may be represented by the position orientation matrix.

Figure 7A:
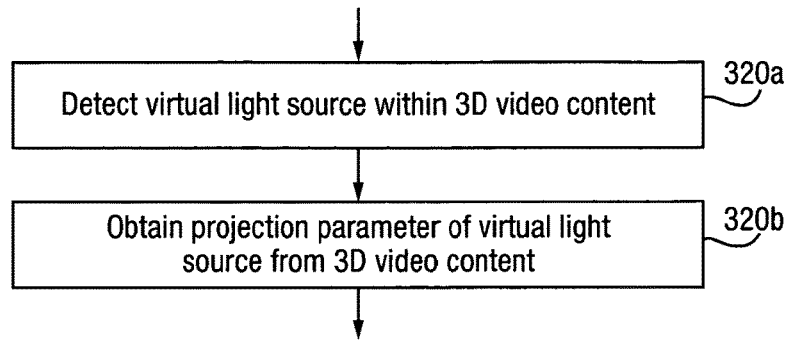

According to other embodiments of the invention, the identifier 808 may identify a reference projection parameter in other ways. In one embodiment, as illustrated in FIG. 7a, step 220a may be replaced by steps 320a and 320b. According to this embodiment, the identifier 808 may detect at step 320a a virtual light source within the 3D video content under consideration. The identifier may then proceed at step 320b to obtain a projection parameter of the virtual light source from the 3D video content. The projection parameter may for example be a position of the light source, a direction vector along which the light source emits light, or a position orientation matrix of the virtual light source.

Figure 7B:
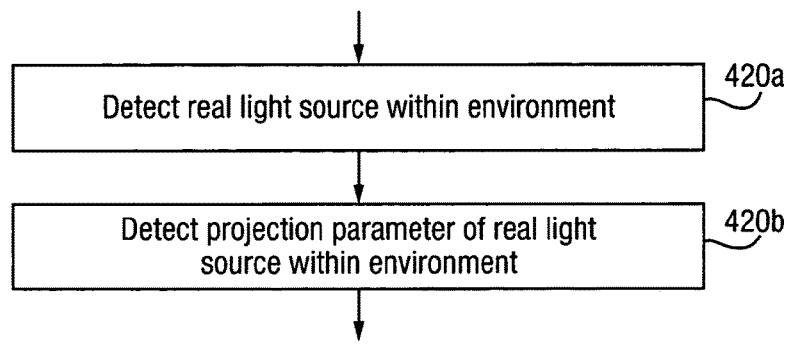
Figure 9:
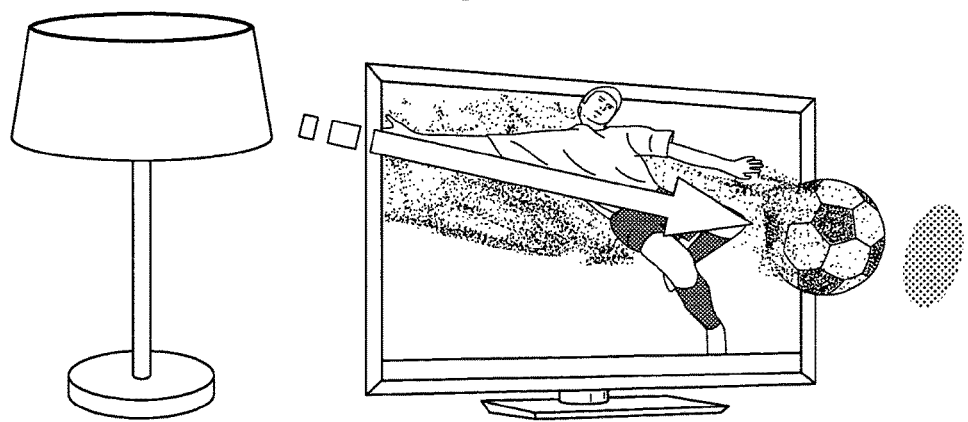
FIG. 9 shows another depth cue generated for the frame of three dimensional video content shown in FIG. 2.

According to another embodiment, as illustrated in FIG. 7b, step 220a may be replaced by steps 420a and 420b. According to this embodiment, the identifier 808 may detect at step 420a a real light source in the environment within which the apparatus is situated. The identifier may then proceed at step 420b to detect a projection parameter of the real light source within the environment. According to this embodiment, the apparatus 800 may further comprise a sensor configured to detect a light source within an environment and to detect a projection parameter of the light source. The light source may for example be a lamp or other artificial light source within a room in which the apparatus is positioned. In such cases the projection parameter may be a position, or a position orientation matrix, of the detected light source. Alternatively, the light source may be the sun, with sunlight for example appearing through a window or door of a room in which the apparatus is positioned. In this case the projection parameter may be a direction vector along which light emitted by the sun travels to reach the video content. The difference in result which may be achieved by obtaining a projection parameter from a detected real light source within an environment is illustrated in FIG. 9. FIG. 9 shows the same 3D video image as FIG. 2, but in FIG. 9 a shadow has been generated based on a projection parameter obtained from a real light source which was detected within the environment, resulting in a very different location for the imitation shadow than can be seen in FIG. 2, where an arbitrary projection parameter representing light emitted from above the content was used.

Figure 7C:
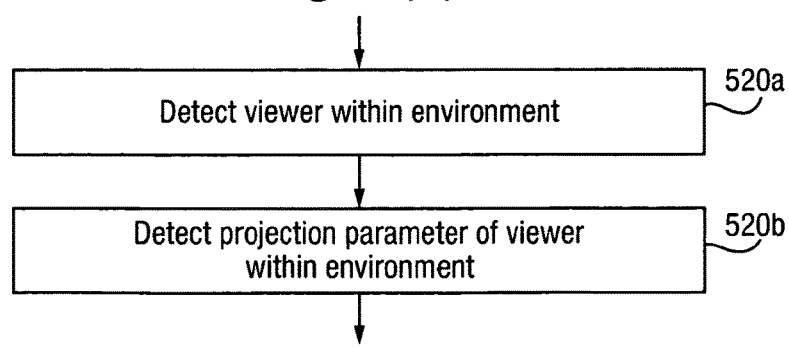

According to another embodiment, as illustrated in FIG. 7c, step 220a may be replaced by steps 520a and 520b. According to this embodiment, the identifier 808 may detect at step 520a a viewer in the environment within which the apparatus is situated. The identifier may then proceed at step 520b to detect a projection parameter of the viewer within the environment. The projection parameter may for example be the position of the viewer. According to this embodiment, the apparatus 800 may further comprise a sensor configured to detect a viewer within an environment and to detect a location of the viewer.

Some or all of the above described embodiments may be combined, for example to permit alternative method steps to be executed depending upon operating conditions. In one example, the identifier 808 may be configured to preferentially detect a light source and corresponding projection parameter within an environment, and only if no light source can be detected, to obtain a projection parameter from a memory of the apparatus 800. In another example, the identifier 808 may be configured to preferentially detect a virtual light source and corresponding projection parameter within the 3D video content, and only if no light source can be detected, to obtain a virtual light source location from a memory of the apparatus 800. Other combinations of alternative method steps may be envisaged. According to other embodiments, the identifier 808 may be configured to first check for a reference projection parameter encoded with the three dimensional video content, and only if such a reference projection parameter is not provided with the video content, to seek to detect a virtual or real light source and corresponding projection parameter.

According to some embodiments, the identifier 808 may detect features of the light source in addition to a projection parameter of the light source. For example intensity and/or colour of the light source may be detected and transmitted to the estimating unit 812 and/or generator 804 to inform shadow estimation and generation.

Each of the discussed embodiments results in the detecting or obtaining of a projection parameter, which may be associated with a virtual or real identified light source. Once this projection parameter has been obtained, the estimating unit 812 proceeds to estimate a location of a shadow that would be generated by the object detected by the detector 806 as a consequence of a light source emitting light according to the projection parameter identified by the identifier 808. The location of the shadow comprises details of shadow properties including width, length etc, as well as positional information for where the shadow is to appear on a shadow receiving surface.

In the illustrated embodiment, and as discussed above, this estimation may be conducted by the estimating unit 812 by projecting, at step 230a of the method 200, the detected object onto a modelled shadow receiving surface according to the identified projection parameter.

A shadow receiving surface may for example be a flat surface or a combination of surfaces. In one example, the shadow receiving surface may be a wall on which the apparatus 800 may be mounted. In another example, the shadow receiving surface may be a combination of surfaces making up a room in which the apparatus 800 is located. The shadow receiving surface may be modelled in advance and stored in a memory of the apparatus 800, or may be modelled by the apparatus 800 using sensors. If the shadow receiving surface is a wall substantially coinciding with a rear surface of the apparatus 800, this may be modelled and stored within a memory of the apparatus 800 by a manufacturer. If the shadow receiving surface is a combination of surfaces forming room, this may be modelled by the apparatus 800 as part of initial set up procedures for the apparatus 800 following installation.

Projection of the detected object may be considered as projection of a three dimensional points cloud representing the object. A 3D points cloud may be generated from a depth map on condition of knowing the 3D camera parameters used to capture the image. These parameters are contained within the camera matrix K for a pinhole camera model and include focal lengths for the camera, a camera principal point etc. A 3D points cloud may be generated using the following formula:

$$Q=d*q*K^{-1}$$

Where:
- q=2D point (expressed in the camera coordinate frame, in homogeneous coordinates)
- d=depth of the 2D point
- Q=[x, y, z]'=the corresponding 3D point in a 3D coordinate frame.

If a depth map is not immediately available for the frame in question, a depth map may be generated using the techniques discussed above with respect to disparity maps.

Figure 8:
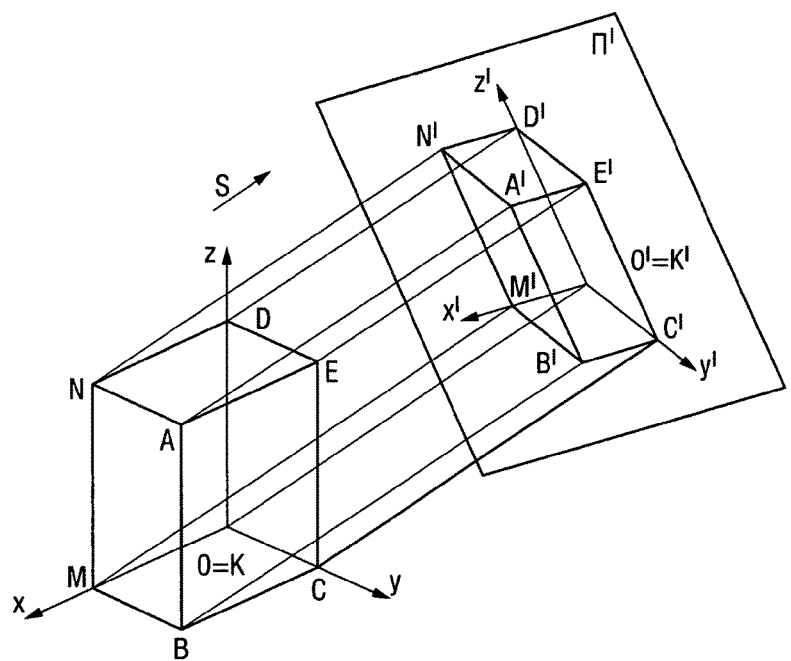
FIG. 8 illustrates an orthogonal projection onto a plane.

The estimating unit 812 may project the object according to the identified projection parameter. As discussed above, the nature of the projection parameter may vary, and may thus represent the emission of light by different types of light source at different locations. For example, the projection parameter may comprise a direction vector, in which case the estimating unit 812 may estimate a location of a shadow that would be caused by a distant light source such as the sun emitting light along the direction vector. The estimating unit 812 may make this estimation by conducting an orthographic projection according to the direction vector. An example of an orthographic projection of an object onto a 2D plane ∏' according to a direction vector S is shown in FIG. 8.

In another example, the projection parameter may comprise a position orientation matrix, in which case the estimating unit 812 may estimate a location of a shadow that would be caused by a light source positioned and emitting light according to the position orientation matrix. This may be appropriate for representation of a less distant virtual or real light source. The estimating unit 812 may make the estimation by conducting a perspective projection of the object onto a plane according to the identified position orientation matrix. In one example, the projection may be made according to the following formula:

$$q=K'*[R,t]^{-1}*Q$$

Where:
- [R, t] is a 3×4 position orientation matrix which may be associated with a virtual or real light source in the 3D screen space
- K' is the 3×3 matrix $$K' = \begin{vmatrix} P, & 0, & 0 \\ 0, & P, & 0 \\ 0, & 0, & 1 \end{vmatrix}$$

P is the smallest distance from the virtual or real light source to the plane ∏'.

P is therefore a perpendicular line starting from the light source and having the same direction vector as the plane ∏'. As discussed above, the location and orientation of the source light may be static or moveable and may be defined by a manufacturer or producer, or may correspond to a detected virtual or real light source.

The projection onto the shadow receiving surface indicates the parameters and position of the shadow to be generated. The position of the projection indicates the positional location of a shadow that would be generated by the object as a consequence of a light source emitting light according to the projection parameter, as illustrated for example by the arrow in FIG. 9. The 2D projection in effect is the shadow, and may be used directly for shadow generation or may be post-processed to reduce noise or add blur. Shadow edges in reality are rarely sharp, and post-processing of the projection edges to add blur can cause the resulting shadow projection to appear more natural.

The positional information obtained from the projection is passed, at step 235 to the generator 804 of the apparatus.

The generator 804 then proceeds, at step 240*a* to project light content imitating a shadow to the location provided by the estimating unit 812. This projection is timed to coincide with display of the frame of 3D video content containing the detected object. In this manner, both the imitation shadow and the object "causing" the shadow are displayed at the same time, forming a coherent depth cue for an observer.

The apparatus 800 may further comprise a lighting system or a projection system suitable for projecting light content to imitate a shadow. The light content may be projected in any suitable manner to generate a visual element substantially resembling a shadow. According to one embodiment, the lighting system may comprise an Ambilight® or similar system. The lighting or projection system may be situated on all sides of a display screen of the apparatus 800, or may be situated on only some areas of the apparatus, for example at a lower edge and sides of a screen.

The generator 804 may project light content imitating a shadow even if the apparatus is not configured to display the three dimensional video content in three dimensions. If the three dimensional video content is displayed in two dimensions, the main depth cues will be missing, so the three dimensional experience may be limited. However, the imitation shadow may still be generated according to embodiments of the present invention.

Following projection of the light content imitating a shadow, the apparatus 800 determines at step 250 whether or not the frame that has been considered is the final frame in the video content. If the frame is the final frame then the video content has ended and no further processing takes place for that video content. If the frame is not the final frame, the apparatus returns to step 210*a* to conduct the method steps for a subsequent frame. In this manner, at an imitation shadow is generated for any appropriate objects in each frame of the video content. As the frames of the video content are displayed consecutively, the objects within the content may appear to move. As each imitation shadow is generated according to content within an individual frame, the imitation shadows projected to coincide with their associated frame appear to follow the motion of the objects generating them in a coherent manner.

According to some embodiments, the processing steps 210a to 235 and 250 of the method 200 may be conducted in advance of the projecting step 240a. Shadow estimation processing may thus be conducted in advance with shadow locations stored in a memory, ready for projection to coincide with display of the corresponding frame of video content. Alternatively, the shadow estimation process may run concurrently with display of the video content.

It will be appreciated that certain of the method steps of the present invention may be conducted on a transmission side, as opposed to on a receiver side as discussed above. Producers of 3D video content may transmit together with the video content information for imitation shadow generation. This information may for example include a list of objects for shadow generation, a reference projection parameter of a virtual light source etc. Such transmission necessitates use of a predefined reference projection parameter, and is thus not suitable for all embodiments of the described invention. However, such advance processing reduces the processing load on the receiving side, which may in certain circumstances be advantageous. In addition, this may enable producers of video content to retain more complete control of how the video content appears when displayed.

The method of the present invention may be implemented in hardware, or as software modules running on one or more processors. The method may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of generating a depth cue for three dimensional video content, comprising:
    (a) receiving video content comprising a plurality of frames;
    (b) detecting, in the received video content, three dimensional video content that will appear in observer space when displayed, and identifying from the detected content one or more objects having a width greater than a threshold value;
    (c) identifying a reference projection parameter;
    (d) estimating a location of a shadow that would be generated by the one or more identified objects as a consequence of a light emitting light according to the reference projection parameter; and
    (e) projecting light content imitating a shadow to the estimated location to coincide with display of the three dimensional video content,
    wherein step (b) comprises identifying three dimensional video content according to a sign of its associated disparity value.

2. The method as claimed in claim 1, wherein steps (b) to (e) of the method are conducted for each of the plurality of frames.

3. The method as claimed in claim 1, wherein the reference projection parameter comprises at least one of a position or a direction.

4. The method as claimed in claim 1, wherein step (c) comprises obtaining a stored projection parameter from a memory.

5. The method as claimed in claim 1, wherein step (c) comprises detecting a virtual light source within the three dimensional video content and obtaining a projection parameter of the virtual light source from the three dimensional video content.

6. The method as claimed in claim 1, wherein step (c) comprises detecting a real light source and a projection parameter of the real light source from a surrounding environment.

7. The method as claimed in claim 1, wherein step (c) comprises detecting a viewer and a projection parameter of the viewer from a surrounding environment.

8. The method as claimed in claim 1, wherein step (d) comprises projecting the detected content onto a modelled shadow receiving surface according to the reference projection parameter.

9. The method as claimed in claim 1, wherein step (e) comprises projecting light content using one of a lighting system or a projector.

10. A computer program product configured, when run on a computer, to implement a method as claimed in claim 1.

11. An apparatus for generating a depth cue for three dimensional video content, comprising:
    an estimator configured to estimate a location for a depth cue; and
    a generator configured to generate the depth cue;
    wherein the estimator comprises:
    a detector configured to detect, in received video content comprising a plurality of frames, three dimensional video content that will appear in observer space when displayed and identify from the detected content one or more objects having a width greater than a threshold value;
    an identifier configured to identify a reference projection parameter; and
    an estimating unit configured to estimate a location of a shadow that would be generated by the one or more identified objects as a consequence of a light source emitting light according to the reference projection parameter,
    wherein the generator is configured to project light content imitating a shadow to the estimated location to coincide with display of the three dimensional video content, and
    wherein the estimator is configured to detect the three dimensional video content according to a sign of its associated disparity value.

12. The apparatus as claimed in claim 11, wherein the apparatus comprises a television.

13. The apparatus as claimed in claim 11, wherein the identifier comprises at least one sensor operable to sense at least one of a light source or a viewer.

14. The apparatus as claimed in claim 11, wherein the generator comprises at least one of a lighting system or a projector system.

15. The method as claimed in claim 1, wherein the received video content is a film or television program.

16. The method as claimed in claim 1, wherein the associated disparity value is received with the video content.

17. The method as claimed in claim 1, wherein identifying three dimensional video content according to a sign of its associated disparity value comprises:
   (i) identifying three dimensional video content having negative disparity, where disparity is measured from right to left, or
   (ii) identifying three dimensional video content having positive disparity, where disparity is measured from left to right.

18. The method as claimed in claim 1, wherein identifying video content according to a sign of its disparity value comprises identifying the content directly from a disparity map.

19. The method as claimed in claim 1, wherein the threshold value is between 5 and 50 pixels.

* * * * *